United States Patent
Arndt et al.

(10) Patent No.: US 6,931,471 B2
(45) Date of Patent: Aug. 16, 2005

(54) METHOD, APPARATUS, AND COMPUTER PROGRAM PRODUCT FOR MIGRATING DATA SUBJECT TO ACCESS BY INPUT/OUTPUT DEVICES

(75) Inventors: Richard Louis Arndt, Austin, TX (US); Luke Matthew Browning, Austin, TX (US); Bruce Mealey, Austin, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 10/116,624

(22) Filed: Apr. 4, 2002

(65) Prior Publication Data

US 2003/0191881 A1 Oct. 9, 2003

(51) Int. Cl.$^7$ .......................... G06F 12/00; G06F 13/14; G06F 13/38
(52) U.S. Cl. ................. 710/240; 710/244; 710/113; 711/203; 711/205; 711/207
(58) Field of Search ................. 710/240–244, 710/111–125; 711/200, 202–209, 308–312

(56) References Cited

U.S. PATENT DOCUMENTS

| | | | | |
|---|---|---|---|---|
| 6,112,286 A | * | 8/2000 | Schimmel et al. | 711/208 |
| 6,128,684 A | * | 10/2000 | Okayama | 710/109 |
| 6,182,168 B1 | * | 1/2001 | Guthrie | 710/52 |
| 6,725,284 B2 | * | 4/2004 | Arndt | 710/5 |
| 6,741,258 B1 | * | 5/2004 | Peck et al. | 345/568 |

* cited by examiner

Primary Examiner—Paul R. Myers
Assistant Examiner—Raymond N Phan
(74) Attorney, Agent, or Firm—Mark F. McBurney; Anthony V.S. England

(57) ABSTRACT

A computer system has physical pages of memory subject to access by input/output ("I/O") devices, and a certain table with entries associating the physical pages with the I/O devices. Responsive to a request for data be moved from a first physical page to a second physical page, an entry is selected for the first physical page in the table. The selected entry indicates an association of the first physical page and one of the I/O devices. Arbitration is temporarily disabled for the selected I/O device so that I/O operations for the I/O device are temporarily disabled. Once arbitration is disabled for the device the data is moved from the first physical page to a second one of the physical pages and the entry is updated in the table to reflect a new association between the I/O device and the second physical page.

29 Claims, 4 Drawing Sheets

FIG. 2
BEFORE MIGRATION

| ENTRY 210.X | P.PG 115.X | V.PG 152.1.X | ENTRY 220.X | P.PG 115.X | V.PG 152.2.X | ENTRY 230.X | P.PG 115.X | V.PG 152.3.X |
|---|---|---|---|---|---|---|---|---|
| 1 | 2 | 2 | 1 | 5 | 2 | ① | ③ | ② |
| 2 | 1 | 3 | 2 | 1 | 1 | 2 | 4 | 5 |
| 3 | 4 | 1 | 3 | 4 | 3 | 3 | 2 | 1 |
| ④ | ③ | ⑤ | 4 | 2 | 4 | 4 | 5 | 4 |

PHYS. MEM. SET 115 OF PGS 115.1, 115.2, ETC.

1ST I/O DEV. V. MEM. SET 152.1 OF PAGES 152.1.1, 152.1.2, ETC.

2ND I/O DEV. V. MEM. SET 152.2 OF PAGES 152.2.1, 152.2.2, ETC.

3RD I/O DEV. V. MEM. SET 152.3 OF PAGES 152.3.1, 152.3.2, ETC.

METHOD, APPARATUS, AND COMPUTER PROGRAM PRODUCT FOR MIGRATING DATA SUBJECT TO ACCESS BY INPUT/OUTPUT DEVICES

BACKGROUND

1. Field of the Invention

The invention concerns physical pages in a computer system, i.e., blocks of volatile memory such as dynamic random access memory ("DRAM"), that are subject to access by input/output ("I/O") devices, and more particularly concerns migrating data among such pages.

2. Related Art

According to a trend in computer systems, a system may be reconfigured while running without disrupting data processing. For example, with multiple operating systems running on the computer, a first one of the operating systems may be using a certain block of memory and there may be a need to reallocate the block of memory to use by a second one of the operating systems. Thus the first operating system must first stop using the block of physical memory. Or, for example, a problem may be detected in a block of physical memory, in which case it may be desirable to remove the memory from operation so that it can be replaced. Once again, whatever operating system was using the block of memory must stop using it.

In certain respects it is relatively straightforward to stop using one block of physical memory and start using another, since mechanisms related to virtual memory management already exist in conventional operating systems to handle some aspects of this problem. But the availability of these mechanisms depends on whether the block of memory is being used for program data. If the block of memory is subject to access by I/O devices the problem is more difficult. (This sort of access is commonly direct memory access ("DMA"), although this may not always be the case.) Blocks of memory subject to access by I/O devices are conventionally "pinned," that is, exempted from being moved because access to them is maintained by essentially endless I/O programs that run as long as the operating system runs. It is disruptive to the system to stop such an I/O program.

Another approach that is not particularly workable would be to invalidate an I/O address translation entry for a block of memory (also referred to as a "page") to be migrated. Then, if an I/O device were to attempt to access the page, the invalid translation entry would cause an I/O page fault to be reported and the I/O device driver would have to respond. That is the driver would restart the I/O operation after the page became available again. In order for this to work, however, the device drivers of all I/O devices that could possibly have access to the page would have to implement I/O page fault recovery code, which is not a practical solution.

From this brief background it should be appreciated that a need exists for a practical way to migrate data from blocks memory that are subject to access by I/O devices.

SUMMARY

The foregoing need is addressed in the present invention. According to a method form of the invention, in a computer system having physical pages of memory subject to access by input/output ("I/O") devices a request is generated for data be moved from a first physical page to a second physical page. Herein, "access by," or "association with," or "requests by" an "I/O device," etc. are meant to include access by, association with, requests by, etc. an I/O adapter for the I/O device.

In the system, a certain table has entries associating the physical pages with the I/O devices. Responsive to the request, an entry in the table associated with the first physical page is selected. The selected entry indicates an association of the first physical page and one of the I/O devices.

"Arbitration," as used herein, includes a method by which I/O devices request and are subsequently granted access to the computer system's I/O data bus so as to initiate direct memory access ("DMA") operations. "DMA" refers to access to the computer system memory without substantial intervention by the system processor. Responsive to the selection of the entry, arbitration is temporarily disabled for the selected I/O device so that I/O operations for the I/O device are temporarily disabled. Once arbitration is disabled for the device the data is moved from the first physical page to a second one of the physical pages and the entry is updated in the table to reflect a new association between the I/O device and the second physical page. Once the data is moved and the table is updated, the arbitration is re-enabled for the device, so that I/O operations with the I/O device are re-enabled.

I/O bus arbitration process selects one of potentially several requests from different I/O devices, granting access to one such request at a time. Since it is a normal condition of arbitration that I/O adapters may have to wait for others to use the bus, I/O adapters are conventionally designed to accommodate a delay in granting I/O bus access. The present invention takes advantage of these conventional features of the arbitration process and I/O adapter design to disable arbitration with respect to a given I/O device while moving the pages without adverse affect on the I/O adapter's operation, as long as the page migration is accomplished within the timeframe of conventional arbitration delays.

Objects, advantages and other forms of the invention will become apparent upon reading the following detailed description and upon reference to the accompanying drawings.

BRIEF DESCRIPTION OF THE DRAWINGS

FIG. 2 illustrates details of certain memory aspects of the system, and illustrates an example of migrating data from a first physical page in the system, according to an embodiment of the present invention.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
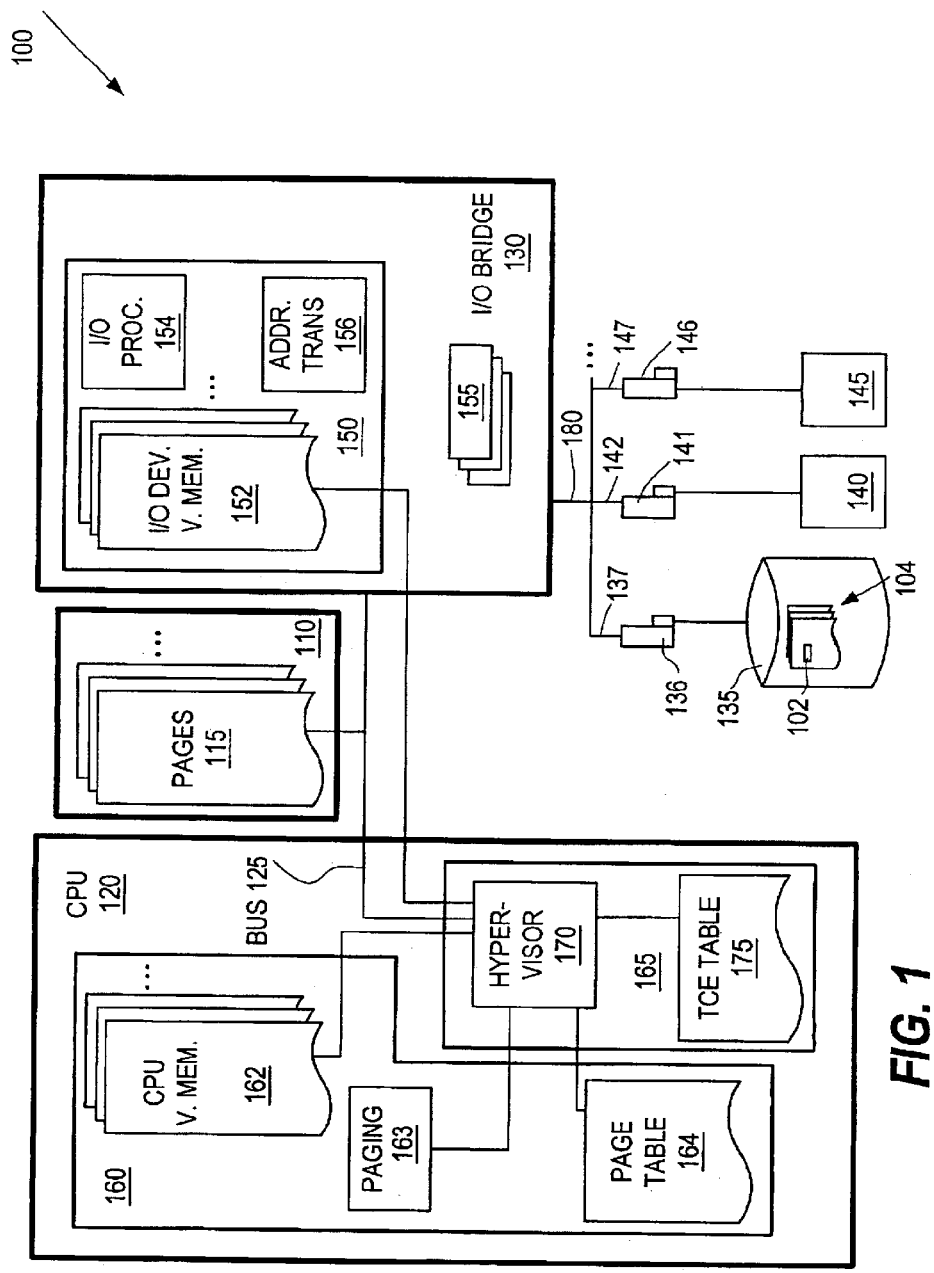
FIG. 1 illustrates a computer system, according to an embodiment of the present invention.

Referring now to FIG. 1, a computer system 100 is shown, according to an embodiment. In the system 100, data 102, which includes instructions, is stored in nonvolatile memory, e.g., disk storage 135, and blocks 104 of the data 102 are written from the nonvolatile memory to the volatile memory 110. As concerns their actual physical location in the volatile memory, the blocks 104 of data 102 are referred to as "physical pages" 115 of data, to distinguish from references to the data 102 having the viewpoint of a virtual memory mapping, as will be explained further herein below. The volatile memory 110 is therefore also sometimes referred to as "physical memory."

With the blocks of data in volatile memory 110, they are accessible by I/O devices 135, 140, 145, etc. and a central processing unit ("CPU") 120 of the system 100. As used herein, the term "I/O device" refers to any of a variety of devices which interface to the computer system 100 and provide information to the system or receive information from the system. Examples of I/O devices include a memory, such as nonvolatile disk storage 135, a mouse, a track ball, touch pad or the like, a keyboard, a display, a printer, a camera, a modem, an optical scanner, a microphone, an audio speaker, etc.

More specifically, the physical pages 115 are coupled by a first bus 125 to an I/O bridge 130 and each of the I/O devices 135, etc. is coupled to the I/O bridge 130 by a corresponding I/O adapter 136, 141, 146 etc. and segment 137, 142, etc. of an I/O bus 180. The I/O bridge 130 also has logic 150, including bus logic that arbitrates among the I/O devices 135, etc., that is, that grants the I/O devices access one-at-a-time to the I/O bus 180, and from the I/O bus 180 to the first bus 125. The I/O bridge 130 also I/O data buffers 155, for caching data 102 from a physical page 115 or an I/O device, such as nonvolatile memory 135, responsive to requests by the I/O devices, and the logic 150 includes logic that handles the data buffering. In the embodiment, the I/O bridge logic 150 includes an I/O processor 154.

The CPU 120 executes operating system and firmware instructions, images of which are represented in FIG. 1 in the CPU as operating system 160 and firmware 165. Instructions for execution by the CPU 120 include firmware instructions 165, operating system instructions 160 that run with the support of the firmware 120, and application instructions (not shown) that run with the support of the firmware 165 and operating system 160. It should be appreciated that the firmware 165 runs on the processor 120 substantially independently of the operating system 160, and provides a lower level of interface and therefore greater access to hardware components such as processor 120 than does the operating system 160. In certain respects, the operating system 160 presents applications running on the CPU 120 a view of the blocks 104 of data 102 as pages of virtual memory 162, so that the actual location of the data 102 is fairly transparent, regardless of whether the data is in volatile memory 110 or on disk storage 135, for example. Accordingly, the operating system 160 includes a paging mechanism 163 and page table 164 for somewhat transparently moving data 102 in and out of volatile memory 110.

Concerning the I/O device virtual memory 152, the operating system 160 directs the I/O logic 150 to map blocks 104 of data 102 to the physical pages 115 via entries in a translation control entry ("TCE") table 175. In the embodiment illustrated, firmware 165 provides services that are put to use for moving data from a first one of the physical pages 115 to a second one of the physical pages 115, so that the first page can be put to a different service or idled. To do this, the operating system 160 finds a set of one or more entries for the first one of the physical pages 115 in the TCE table 175. Then the operating system 160 directs a firmware 165 component, i.e., Hypervisor 170, to copy the data from the first physical page 115 associated with a given I/O device virtual memory page 152 to the second physical page 115, then change the associated mapping in the TCE Table 175 such that future accesses to I/O device virtual memory page 152 are directed to the second physical page. The Hypervisor 170 has a number of functions, including among others, keeping the TCE table 175 updated, and maintaining memory coherency with respect to I/O operations.

To understand the TCE table 175, consider that I/O devices 135, etc. have their own view of data 102 as pages of virtual memory 152, similar to the virtual memory view of the CPU 120. The I/O bridge logic 150 presents this view to the I/O devices 135, etc. In other embodiments, the I/O processor 154 and firmware 165 presents this view to the I/O devices 135, etc. To maintain this view, the entries (not shown in FIG. 1) in the TCE table 175 map the blocks 104 of data 102 to the I/O virtual memory pages 152. Accordingly, I/O devices 135, etc. may refer to the data 102 by reference to the virtual page 152 regardless of the actual location of the data, that is, regardless of which physical page 115 may be currently storing the data.

I/O bridge 130 provides logic 150 that lies between bus 125 and bus 180. Memory requests on bus 180 come in from I/O devices with virtual addresses to reflect I/O device virtual memory 152. Address translation logic 156 effectively accesses TCE Table 175 (which is kept in I/O device virtual page order) to determine the physical page address that it should apply to bus 125 in order to access the correct physical page 115 associated with the memory request from bus 180. (Above, the term "effectively" is used because in reality the logic 150 contains cached copies of the relevant sections of the TCE table 175 so that the process is sped up.)

Referring now to FIG. 2, the TCE table 175 and a number of physical pages 115 and I/O virtual memory pages 152 are shown in more detail to illustrate an example of migrating data from a first one of the physical pages 115, according to an embodiment. Specifically, as shown in FIG. 2 individual ones of the physical pages 115 may be referred to as 115.1, 115.2, etc. In the example illustrated, data from page 115.3 is targeted for migrating. Virtual memory pages 152 are shown from the viewpoint of respective I/O devices 135, etc. That is, a first set of pages 152.1 is for a first I/O device, e.g., disk 135, a second set of pages 152.2 is for a second I/O device, e.g., device 140, and a third set 152.3 is shown for a third I/O device 145, etc.

The sections 210, 220, 230, etc. and specific entries 210.1, 210.2, etc. in each section are shown for the TCE table 175. These sections correspond to respective first, second, etc. I/O devices, e.g. devices 135, 140, etc. (FIG. 1). In this manner the section in the table 175 in which an entry 200 is located indicates the I/O device which may access the physical page corresponding to that entry. In the example illustrated, the targeted physical page 115.3 is viewed by the first I/O device as virtual memory page 152.1.5, while it is viewed by the third I/O device as virtual memory page 152.3.2. Based on the lack of entries in the second section 220 of table 175 for the page 115.3, the Hypervisor 170 (FIG. 1) determines that the second I/O device has no mapping to page 115.3. That is, page 115.3 is not subject to access by the second I/O device.

Summarizing the above, the Hypervisor 170 has identified the I/O devices which may access page 115.3 (and those which may not) by finding entries for physical page 115.3 in the table 175. Specifically, in the example of FIG. 2 and with reference also to FIG. 1, the Hypervisor 170 has determined that the first I/O device 135 and the third I/O device 145 may access page 115.3 Having accomplished the above, the Hypervisor 170 directs the I/O bus logic 150 to temporarily disable arbitration for bus segments 137 and 142 associated with I/O devices 135 and 145 indicated in the entries 210.4 and 230.1. That is, bus logic 150 temporarily withholds permission for communication between I/O adapters 136 and 146 and the I/O bus 180. Note that this disabling of arbitration is not only temporary, but it is also selective. That is, in the example, arbitration is not disabled for the second I/O device 140, since page 115.3 is not subject to access by device 140.

Data buffers 155 on DMA writes are automatically written back by the bridge 130 hardware when they are full. If they are partially filled and waiting for a subsequent DMA request to either fill them or reference a discontiguous address range (indicating that the DMA will not be filling the buffer), then they are "outstanding." Consequently, before moving data from one physical page 115 to another the Hypervisor 170 flushes the I/O data buffers 155. That is, in the present example, data from the I/O data buffers 155 is selectively written back to physical page 115.3. The forced write back is to flush out such partially written a I/O buffers.

Figure 3:
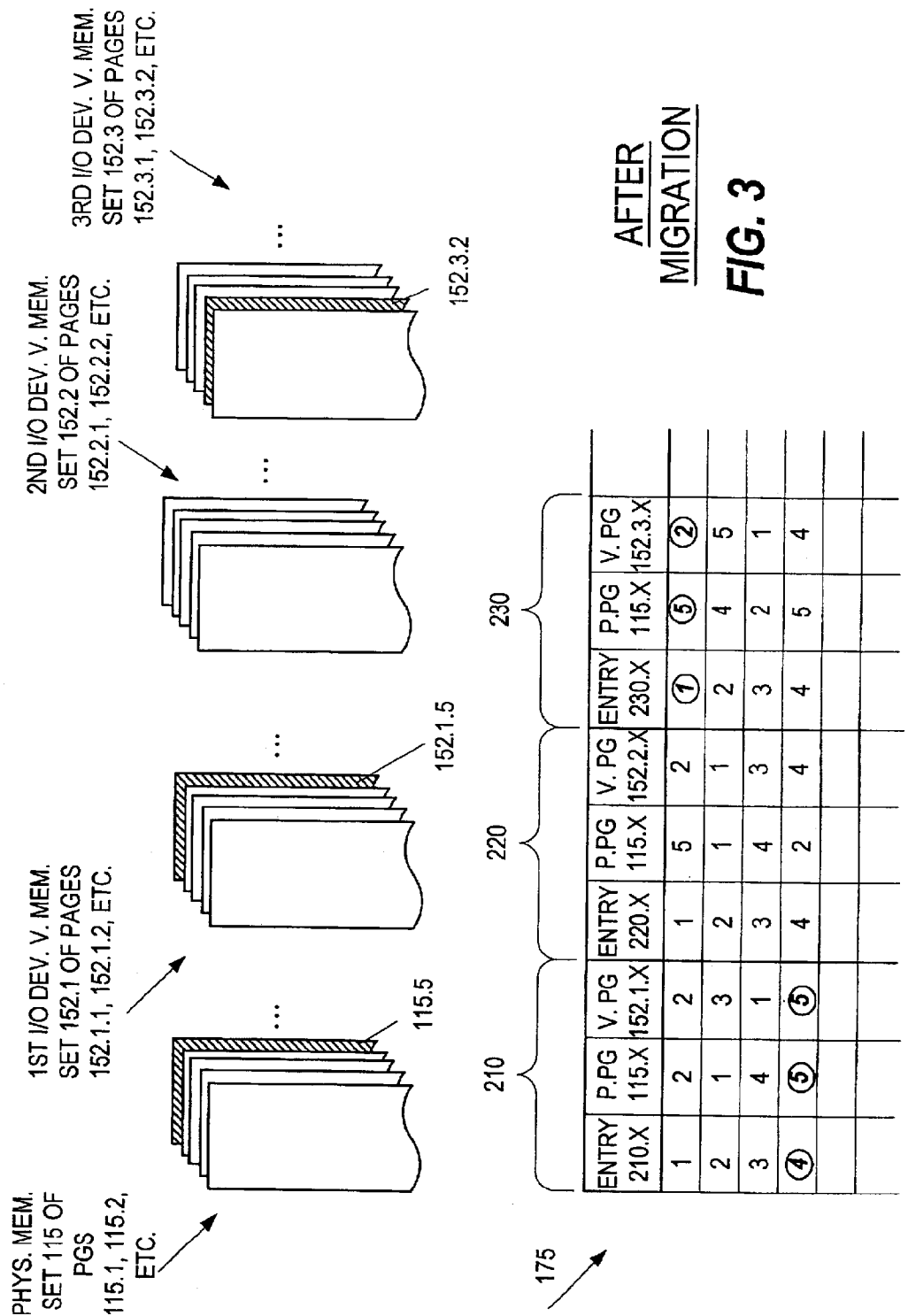
FIG. 3 illustrates further aspects of the example, in which the data is moved to a second physical page in the system and a certain table is updated, according to an embodiment of the present invention.

Referring now to FIG. 3, the example of FIG. 2 is continued, according to which the Hypervisor 170 (FIG. 1) moves the data from the first physical page 115.3 to a second physical page 115.5. Once the data is moved, the Hypervisor 170 updates the set of entries in the table 175. As shown, after the update, the entry 210.4 references virtual page 152.1.5 to the new physical page 115.5, and the entry 230.1 virtual page 152.3.5 to the new physical page 115.5.

Referring again to FIG. 1, having moved the data, and having updated the table 175, the Hypervisor 170 directs the I/O bus logic 150 to re-enable the I/O bus 180 arbitration for the bus segments 137 and 147, enabling the associated I/O devices 135 and 145 to proceed with I/O operations, including any I/O operations that were pending or in-progress at the time the arbitration was disabled.

Figure 4:
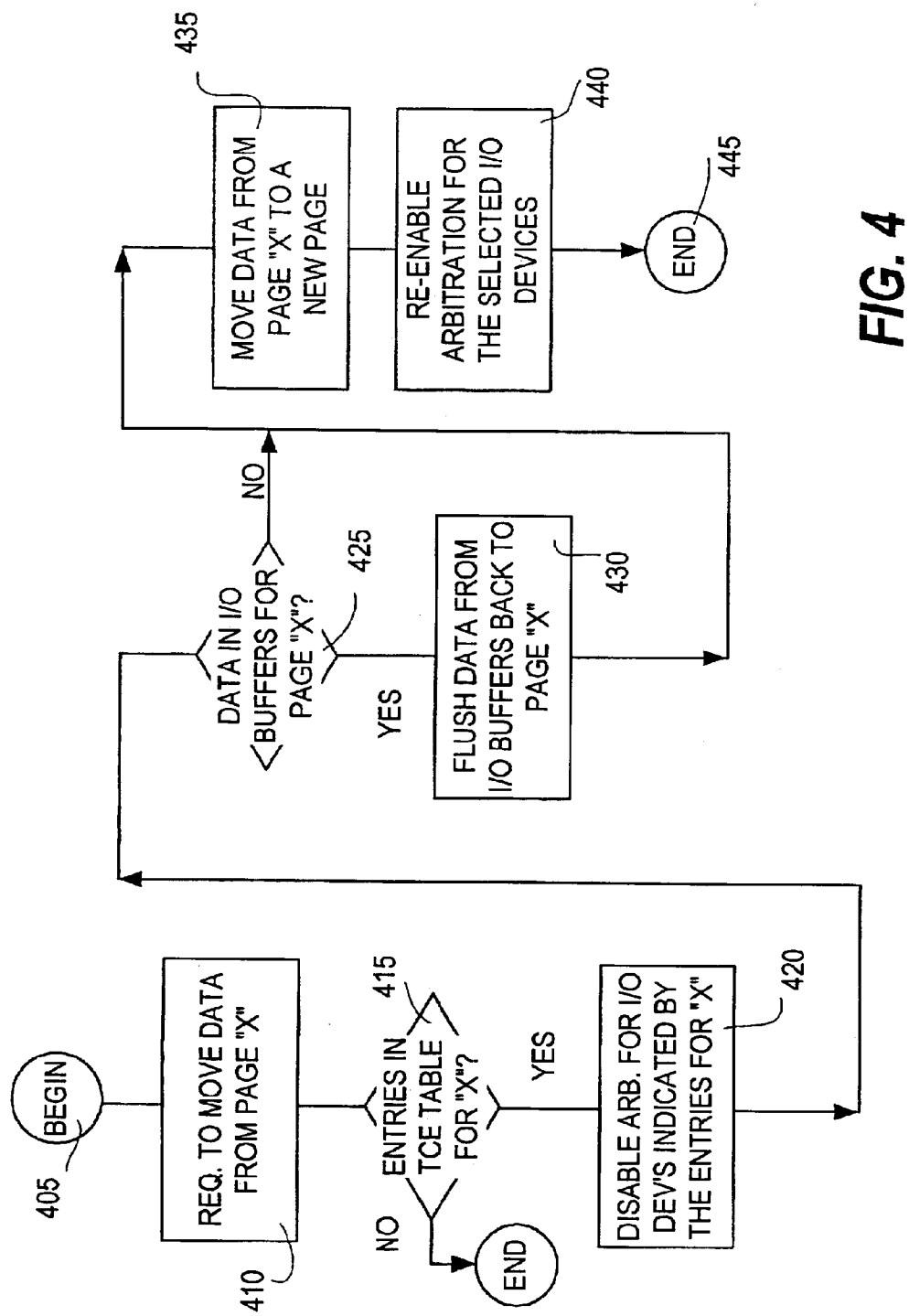
FIG. 4 illustrates certain logic aspects in a flow diagram, according to an embodiment of the present invention.

Referring now to FIG. 4, certain logic aspects of an embodiment are illustrated in a flow diagram which begins at 405. (In the following, no distinction is made as to whether actions are taken by the CPU 120 or the I/O processor 154, or whether the actions are responsive to operating system instructions or firmware instructions.) Responsive to receiving a request to move data from a physical page "X" to a physical page "Y" at 410, the logic next searches for entries for page X in the TCE table at 415. If no entries are found, the algorithm ends at 450. If entries are found, at 420 the logic disables arbitration rather for the I/O devices indicated by the entries.

Next, at 425, the logic determines whether there is data in the I/O buffers of the I/O bridge for the particular page X. If yes, then the data in the buffers that is for page X is flushed back to that page at 430. If no, the action at 430 is skipped. The logic then, at 435, moves the data from page X to a new physical page. Finally, at 440, arbitration is re-enabled for the selected I/O devices, and the algorithm ends at 445.

It should be more understandable from the foregoing, that it is a particular advantage of the invention that I/O operations are selectively held off for an interval that is short enough so that I/O devices do not consider it to be an error, but long enough to perform the page copy and address translation changes that are needed for migration. This allows for page migration using standard device drivers, that is, without support for I/O page faults, and without having to wait for all I/O operations to complete. Previously disabling of arbitration has been used to permanently disallow an I/O adapter from accessing memory, rather than merely holding off a request for a brief interval.

The description of the present embodiment has been presented for purposes of illustration, but is not intended to be exhaustive or to limit the invention to the form disclosed. Many modifications and variations will be apparent to those of ordinary skill in the art. For example, while certain aspects of the present invention have been described in the context of a fully functioning data processing system, those of ordinary skill in the art will appreciate that processes of the present invention are capable of being distributed in the form of a computer readable medium of instructions in a variety of forms and that the present invention applies equally regardless of the particular type of signal bearing media actually used to carry out the distribution. Examples of computer readable media include RAM, flash memory, recordable-type media, such a floppy disk, a hard disk drive, a ROM, and CD-ROM, and transmission-type media such as digital and analog communications links, e.g., the Internet.

For example, it should be understood that while certain operations have been described as being handled by CPU 120 or I/O processor 154 responsive to the operating system or the firmware, it would be within the spirit and scope of the invention to encompass an embodiment wherein the operations are allocated somewhat differently among the system resources.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention. Moreover, it should be understood that the actions in the following claims do not necessarily have to be performed in the particular sequence in which they are set out.

What is claimed is:

1. A method in a computer system having physical pages of memory subject to access by input/output ("I/O") devices, the method comprising:

selecting, responsive to a request that data be moved from a first one of the physical pages to another one of the physical pages, an entry for the first physical page in a certain table, wherein the table has entries associating the physical pages with the I/O devices and the selected entry indicates an association of the first physical page and one of the I/O devices;

disabling arbitration for the selected I/O device, so that I/O operations for the I/O device are temporarily disabled;

moving the data from the first physical page to a second one of the physical pages and updating the entry in the table to reflect a new association between the I/O device and the second physical page; and re-enabling the arbitration, so that I/O operations with the I/O device are re-enabled.

2. The method of claim 1, wherein the temporary disabling of the I/O operations includes disabling I/O operations pending for the I/O device.

3. The method of claim 1, wherein the temporary disabling of the I/O operations includes disabling I/O operations in-progress for the I/O device.

4. The method of claim 1, wherein the selecting of the entry in the table includes a firmware selecting operation.

5. The method of claim 1, wherein the requesting includes a request by an operating system.

6. The method of claim 1, comprising flushing data of at least one I/O data buffer back to the first physical page prior to the moving of the data from the first physical page.

7. The method of claim 1, wherein the selecting of an entry includes selecting a set of entries for the first physical page, the selected set indicating associations of the first physical page and a set of the I/O devices, wherein the disabling of arbitration includes disabling arbitration for the set of I/O devices, and wherein the updating includes updating the selected set of entries in the table to reflect new associations between the selected set of I/O devices and the second physical page.

8. The method of claim 7, wherein the disabling of arbitration is selectively limited to solely disabling arbitration for the selected set of I/O devices.

9. A computer system comprising:

a system processor;

at least one memory having physical pages of data;

instructions stored in at least one of the memories, wherein the system processor is operable, responsive to the instructions, to request that data be moved from a first one of the physical pages to another one of the physical pages, and to select an entry for the first physical page in a certain table, the table having entries associating the physical pages with input/output ("I/O") devices and the selected entry indicating an association of the first physical page and one of the I/O devices; and an I/O bridge, including logic for controlling I/O operations, wherein the physical pages of memory are subject to access, via the I/O bridge, by the I/O devices, and the logic in the I/O bridge is operable, responsive to notice from the processor of the selected entry, to disable arbitration for the selected I/O device, so that I/O operations for the I/O device are temporarily disabled, and is operable to re-enable the arbitration responsive to the data being moved from the first physical page to a second one of the physical pages and to notice from the system processor that the entry in the table has been updated to reflect a new association between the I/O device and the second physical page, so that I/O operations with the I/O device are re-enabled.

10. The system of claim 9, wherein the I/O bridge logic is operable to perform the moving of the data from the first physical page to the second physical page.

11. The system of claim 9, wherein the system processor is operable, responsive to the instructions, to perform the updating of the entry in the table to reflect the new association between the I/O device and the second physical page.

12. The system of claim 9, wherein the instructions include operating system instructions and firmware instructions, and wherein the requesting that data be moved includes requesting by the system processor responsive to the operating system instructions and the selecting of an entry includes selecting by the processor responsive to the firmware instructions.

13. The system of claim 12, wherein the system processor is operable, responsive to the firmware instructions, to perform the moving of the data from the first physical page to the second physical page.

14. The system of claim 9, wherein the temporary disabling of the I/O operations includes disabling I/O operations pending for the I/O device.

15. The system of claim 9, wherein the temporary disabling of the I/O operations includes disabling I/O operations in-progress for the I/O device.

16. The system of claim 12, wherein the selecting of the entry in the table includes selecting by the processor responsive to the firmware instructions.

17. The system of claim 12, wherein the requesting includes requesting by the processor responsive to the operating system instructions.

18. The system of claim 9, wherein the system processor is operable responsive to the instructions to flush data of at least one I/O data buffer back to the first physical page prior to the moving of the data from the first physical page.

19. The system of claim 9, wherein the I/O bridge logic is operable to flush data of at least one I/O data buffer back to the first physical page prior to the moving of the data from the first physical page.

20. The system of claim 9, wherein the selecting of an entry includes selecting a set of entries for the first physical page, the selected set indicating associations of the first physical page and a set of a number of the I/O devices, wherein the disabling of arbitration includes disabling arbitration for the set of I/O devices, and wherein the updating includes updating the selected set of entries in the table to reflect new associations between the selected set of I/O devices and the second physical page.

21. The system of claim 20, wherein the disabling of arbitration is selectively limited to solely disabling arbitration for the selected set of I/O devices.

22. A computer program product for use managing physical pages subject to access by input/output ("I/O") devices, the computer program product comprising computer readable storage media having computer instructions for causing a computer system to perform:

requesting that data be moved from a first one of the physical pages to another one of the physical pages;

selecting, responsive to the request, an entry for the first physical page in a certain table, wherein the table has entries associating the physical pages with the I/O devices and the selected entry indicates an association of the first physical page and one of the I/O devices;

disabling arbitration in an I/O bridge of at least a bus segment associated with the selected I/O device, so that I/O operations for the I/O device are temporarily disabled;

moving the data from the first physical page to a second one of the physical pages and updating the entry in the table to reflect a new association between the I/O device and the second physical page; and re-enabling the arbitration, so that I/O operations with the I/O device are re-enabled.

23. The computer program product of claim 22, wherein the temporary disabling of the I/O operations includes disabling I/O operations pending for the I/O device.

24. The computer program product of claim 22, wherein the temporary disabling of the I/O operations includes disabling I/O operations in-progress for the I/O device.

25. The computer program product of claim 22, wherein the selecting of the entry in the table includes a firmware selecting operation.

26. The computer program product of claim 22, wherein the requesting includes a request by an operating system.

27. The computer program product of claim 22, comprising flushing data of at least one I/O data buffer back to the first physical page prior to the moving of the data from the first physical page.

28. The computer program product of claim 22, wherein the selecting of an entry includes selecting a set of entries for the first physical page, the selected set indicating associations of the first physical page and a set of a number of the I/O devices, wherein the disabling of arbitration includes disabling arbitration for respective at least bus segments associated with the set of I/O devices, and wherein the updating includes updating the selected set of entries in the table to reflect new associations between the selected set of I/O devices and the second physical page.

29. The computer program product of claim 22, wherein the disabling of arbitration is selectively limited to solely disabling arbitration for the bus segments associated with the selected set of I/O devices.

* * * * *